July 16, 1963

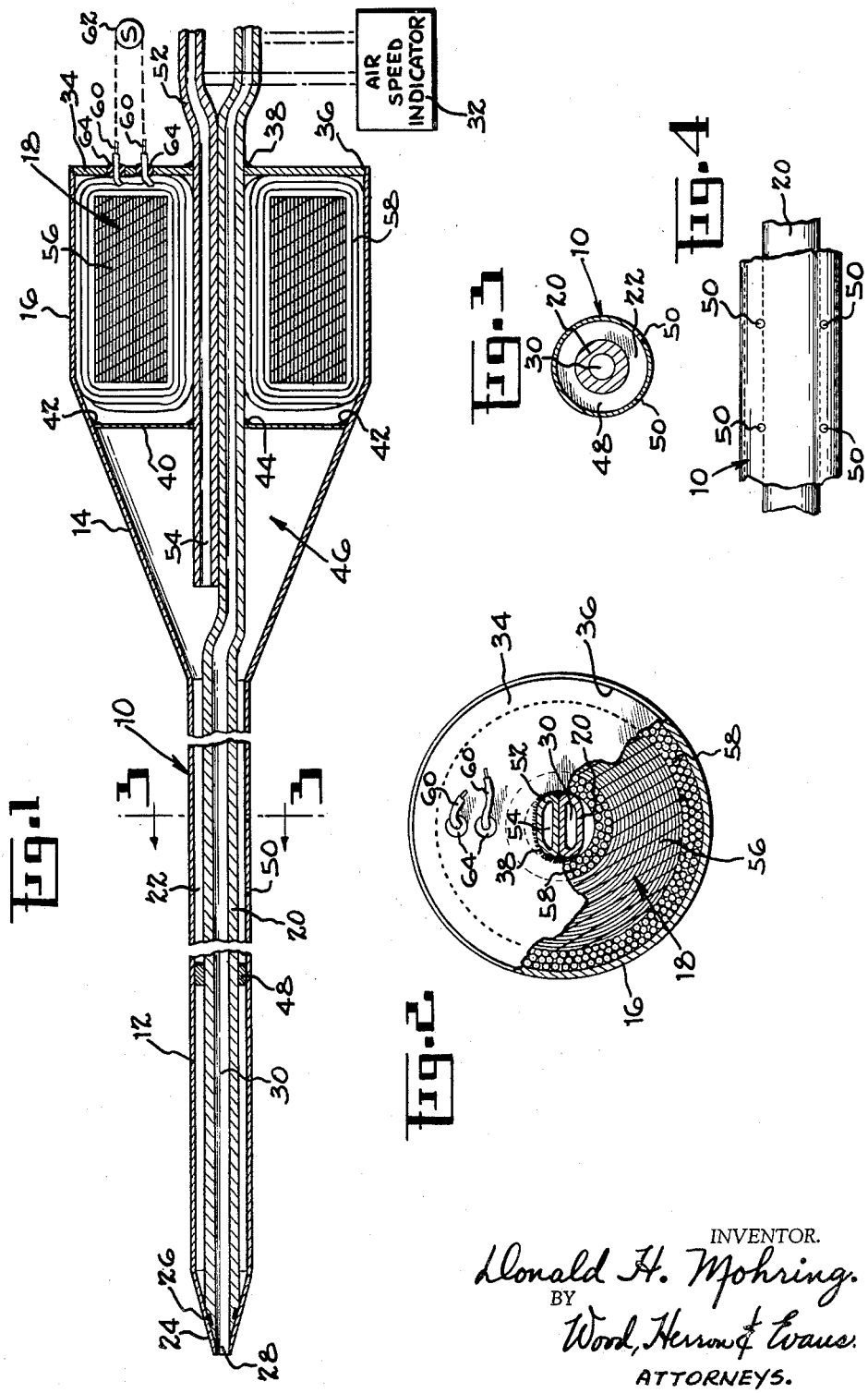

D. H. MOHRING 3,097,528

HEATED PITOT TUBE

Filed April 8, 1958

INVENTOR.
Donald H. Mohring.
BY
Wood, Herron & Evans.
ATTORNEYS.

United States Patent Office 3,097,528
Patented July 16, 1963

3,097,528
HEATED PITOT TUBE
Donald H. Mohring, Oakland Park, Fla., assignor to U.S. Industries, Inc., a corporation of Delaware
Filed Apr. 8, 1958, Ser. No. 727,201
11 Claims. (Cl. 73—212)

This invention relates to Pitot tubes which are employed in aircraft to measure air speeds. More specifically, the invention is directed to a Pitot tube, capable of withstanding the rigors of supersonic flight, which incorporates novel means to prevent ice from accumulating upon it, and thereby destroying its usefulness, while in flight through icing weather conditions.

One form of Pitot tube includes two tubes arranged one inside of the other. The inner tube, or total pressure tube, is open at its forward end in the direction of flight so that air impinging upon it, due to the forward motion of the aircraft through the air, increases the air pressure within the tube. The outer tube, or static pressure tube, is closed at its forward end and it has one or more orifices in its side opening in a direction normal to the line of flight to atmospheric pressure. The difference in the two pressures is a function of the velocity of the aircraft, and therefore, by a fundamental relation, if the two pressures are known, the velocity of the aircraft can be determined. The total pressure and static pressure tubes typically are connected to a pressure sensitive instrument in the cockpit of the aircraft which translates the difference between the two pressures existing within the tubes into direct velocity readings.

The present invention is concerned primarily with the heating of a Pitot tube for deicing purposes, but the problem of providing adequate heat is complicated by structural and design limitations imposed by the severe conditions attending supersonic flight. Accuracy under all flight conditions and at all speeds is, of course, paramount in the design of any Pitot tube. But the tube must be structurally strong in order to withstand the stresses, buffeting and vibrations which inhere in supersonic flight. Furthermore, in order to keep drag at a minimum and so that the tube itself does not create turbulence, the frontal area of the tube must be small. Ideally, the outer tube structure should be adaptable to special aerodynamic shapes for use on anticipated aircraft intended for flight at speeds not yet achieved, these shapes being designed to prevent shock waves at the front of the tube created by such speeds from disrupting pressure measurements.

Of itself, the requirement for a small or slender tube created a difficult problem, one solution to which is found in copending patent application Serial No. 684,128, filed September 16, 1957, now Patent No. 2,984,107. The Pitot tube of that application employs electrically resistant heating coils to melt ice accumulations and it has met the stringent requirements of its intended use. However, heating coils burn out eventually, and this may occur, or at least not be detected, except under actual flight conditions when ice is encountered. If the deicing system should fail during flight, the results might be disastrous. Accordingly, it is highly desirable either to provide a secondary heating system to be used in the event of a failure of the first, or to provide a deicing system which is not subject to failure.

It was difficult enough to compact an adequate heating system into the small space available in the Pitot tube of the copending application. The duplication of such a system, utilizing electrically resistant heating coils, simply requires more space than is available in a tube having the desired minimum frontal area.

The primary objective of this invention has been to provide a deicing system in which the components of the Pitot tube itself are electrical conductors and are heated by the passage of electrical current through them. Otherwise expressed, the Pitot tube of this invention is its own heating element, and the likelihood of failure of this element is practically non-existent unless the tube itself is destroyed. There are no heating coils to burn out, and, of course, it is therefore not necessary to provide space for such coils. On the other hand, in the event a two-element system is required, the heating system of this invention may be used in conjunction with the heating system of the copending application to which reference has been made, and it will be apparent that this may be done without increasing the frontal area of the Pitot tube disclosed in the previous application.

In the embodiments of the invention which are illustrated and described in detail below, the objective of the invention is fulfilled by arranging the static pressure and total pressure tubes concentrically, as has been done in the past, and then connecting them at their forward and rear ends to form a one-turn secondary winding of a transformer. The transformer is completed by an iron core and a toroidally wound primary winding surrounding the inner tube. Thus, electrical current supplied to the primary circuit induces a current in the components of the tube itself, and it is this induced current that supplies heat for deicing purposes. It is found that the electrical power supply normally available in an aircraft can, through proper transformer design, induce a sufficiently high density current in the Pitot tube to develop temperatures up to 600°–800° F. at critical locations on the Pitot tube which are the most likely to be the starting places for ice accumulations.

A Pitot tube utilizing the transformer principle of this invention has a number of advantages over previous designs. If a secondary heating system is not desired, the space ordinarily occupied by a resistance heating element can be utilized for other purposes or the overall diameter of the tube can be reduced substantially. The system allows more space for the static pressure passageway, thus reducing static lag problems. Furthermore, if the diameter is reduced, a shorter Pitot tube assembly is permitted which in turn decreases the total boundary layer friction in the pressure passageways.

An important consideration is that high potential problems are eliminated by the new design, since no heating coils are required in the tube itself. In prior designs, the heating coils were supplied with 115 volts. Because of the very small space available for the coils, the coils were so close to being grounded on the metallic Pitot tube that the danger of a short circuit, at 115 volts, was always present.

The simplicity of the present design permits the elimination of many brazed joints which heretofore caused lag problems and which are susceptible to leakage. Reduction of the brazed joints also reduces the hazard of fractures at these joints as a result of vibrations. Furthermore, the simplicity of the design simplifies repairs and cuts maintenance costs drastically.

Because the current heats the tube directly, less wattage is required to develop a predetermined skin temperature, as compared to coil heating systems in which the heat must pass from the heating coil through insulation or an air space before reaching the tube.

Elimination of the heating coil from the front portion of the tube reduces the weight of the tube and moves the center of gravity back toward the boom by a considerable amount.

In prior designs, requiring a heating coil in the nose of the Pitot tube, the nose cone shape of the Pitot tube was restricted due to the limitations placed upon it by the requirement of its containing the heating coil. Where no heating coil is required, many variations of nose cone configuration are possible, including such shapes as are desirable to reduce shock waves.

Other objectives and features of the invention will be readily apparent from the following detailed description taken in conjunction with the accompanying drawings in which:

FIGURE 1 is a longitudinal sectional view of one form of the invention.

FIGURE 2 is a rear elevational view with parts broken away to illustrate details of construction.

FIGURE 3 is a cross sectional view taken along line 3—3 of FIGURE 1.

FIGURE 4 is an enlarged fragmentary view of a portion of the Pitot tube showing static air holes.

Figure 5:
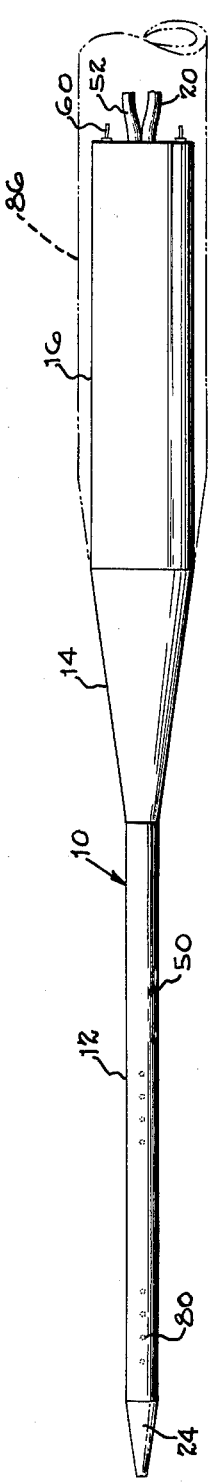
FIGURE 5 is a side elevational view of a modified embodiment of the invention.

The principles of the invention may be utilized in a number of different ways with the Pitot tubes taking various shapes. Two forms of the invention are disclosed here, but it is to be understood that the forms are illustrative only. For example, concentricity of static and total pressure tubes is not absolutely necessary inasmuch as the tubes might well be disposed in side by side relation with insulation separating the tubes over the major portion of their length. It will also be apparent that the invention is applicable to a Pitot tube designated to measure total pressure only, in this case the static pressure tube being eliminated and an outer cover for the total pressure tube being used to complete the electrical circuit. The shape and disposition of the transformer is subject to substantial variation. For example, a transformer secondary formed by the Pitot tube need not necessarily be of one turn, but instead could be of a plurality of turns with the forwardly projecting Pitot tube forming an extension of the loops of one of the turns.

In referring more particularly to the drawings, the form of the invention shown in FIGURES 1–4 includes a static pressure tube 10 having a generally cylindrical forward section 12, a flared rear section 14, and a rearmost cylindrical section 16 which surrounds a transformer indicated generally at 18.

A total pressure tube 20 is disposed within the static pressure tube 10 and is generally concentric with it leaving an annular space or chamber 22 between the total pressure tube 20 and the static pressure tube 10.

The forward ends of both the static pressure and the total pressure tubes are tapered to engage each other along a frusto-conical surface 24 and are joined together by silver solder 26 or like means to form an intimate electrical connection. The total pressure tube has a forward opening 28 through which air pressure is admitted to be transferred through a passage 30, formed by the total pressure tube, to an air speed indicator illustrated diagrammatically only at 32.

The rear ends of the total pressure tube and static pressure tubes are joined by a member 34 of highly conductive material which may be in the form of one or more thin, laminated disks to form not only an electrical connection between the outer and inner tubes, but to form a flexible diagram between the tubes to permit longitudinal differential expansion of one tube with respect to the other without destroying the intimate electrical connection between the two tubes at the rear end. The diaphragm member 34 may be silver soldered, brazed or welded around its outer periphery 36 to the outer tube and around a central hole at 38 to the inner tube 30.

Forward of the transformer 18 a thin disk 40 of conductive but highly resistive material such as Nichrome is disposed. The disk 40 is brazed, soldered or welded at 42 to the tapered section 14 of the static pressure tube and at 44 to the inner tube to form the base of the generally conical chamber 46 at the end of the static pressure tube. The disk 40 would not necessarily have to seal off the rear of the static pressure tube as that function could be performed by the disk 34 which is positioned to the rear of the transformer. Disk 40, in addition, being thin, permits relative movement between the inner and outer tubes as in the case of disk 34.

Approximately midway between the forward end and the tapered section 14 of the Pitot tube, a Nichrome or other high resistance washer is disposed in the annular chamber 22 and electrically joined to the inner tube 20 and the static pressure tube 10. Immediately to the rear of the Nichrome washer 48 are four static pressure orifices 50 formed in the undersurface of the static pressure tube 10. (See FIGURE 4.) The static pressure orifices 50 are located in the underside of the tube 10 in order to avoid the introduction of water into the Pitot tube.

The relative position of the Nichrome washer with respect to the static pressure orifices 50 provides an area of increased heat adjacent the static pressure orifices 50. The area of increased heat arises from the parallel circuit formed by the Nichrome washer 48, the parallel circuit consisting of that at the tip of the Pitot tube and that formed by the Nichrome washer joining the outer tube 10 with the inner tube 20. The high resistance of the Nichrome washer provides the additional heating as the current passes through the washer 48.

At the rear of the Pitot tube, a connecting tube 52 having a passage 54 connects the generally conical chamber 46 with the air speed indicator 32. The connecting tube 52 passes through the disks 34 and 40 and it is intimately electrically connected to the total pressure tube 20. The intimate electrical connection of tube 52 with tube 20 increases the cross sectional area of the inner tube at the area of the transformer and consequently decreases its resistance to the passage of current. The reduced resistance of the inner tube at this area causes a consequent reduction in the temperature of the secondary circuit at the area of the transformer where it is not needed for de-icing purposes.

The transformer 18 which surrounds the combined tubes 20 and 52 consists of a spirally wound laminated iron core 56 on which a toroidally wound primary 58 is mounted. The primary winding is connected by leads 60 to a source of voltage 62. The source of voltage 62 may be the 115 volt, 400 cycle voltage supply normally found in aircraft of the type to which the Pitot tube of the present invention is to be applied. The leads 60 are connected through the plate 34 by glass beads or grommets 64 which can provide a hermetic sealing of the leads to the plate.

The alternative form of the invention illustrated in FIGURE 5 is similar in many respects to the form of the invention illustrated in FIGURES 1–4. Consequently, for convenience, like parts will be designated by like numerals.

The Pitot tube of FIGURE 5 differs in part from that or FIGURES 1–4 in the shape of the transformer 18. In FIGURE 5, the transformer 18 is long and thin, the long, thin shape permitting reduction in cross sectional area of the Pitot tube assembly at the rear end thereof.

The Pitot tube of FIGURE 5 also differs from that shown in FIGURES 1–4 in the section of the structure forward of the Nichrome washer 48. The tube 10 is joined to the tube 20 at the nose thereof as before by a soldered connection 26. Intermediate the nose and the washer 48, however, the tube 20 is interrupted, and the adjacent ends 70 and 72 are sealed by plugs 74 and 76. The forward tube section 78 is provided in the upper portion thereof with a plurality of orifices 80 which provide a communication between passage 30 of the inner tube and the annular chamber 22 between the inner and outer tubes. Similarly, the rear portion of the inner tube is apertured in the upper portion thereof to form a plurality of orifices 82 communicating between the passage 20 and the annular chamber 22 to the rear of the plug 72. The forward and rearward sections of the tube 20 are joined by a silver ribbon 84 of equal or better electrical conductivity than the total pressure tube 20. With the arrangement illustrated, the space forward of washer 48 becomes a water trap for any moisture which may enter the Pitot tube through the forward opening 28.

Figure 6:
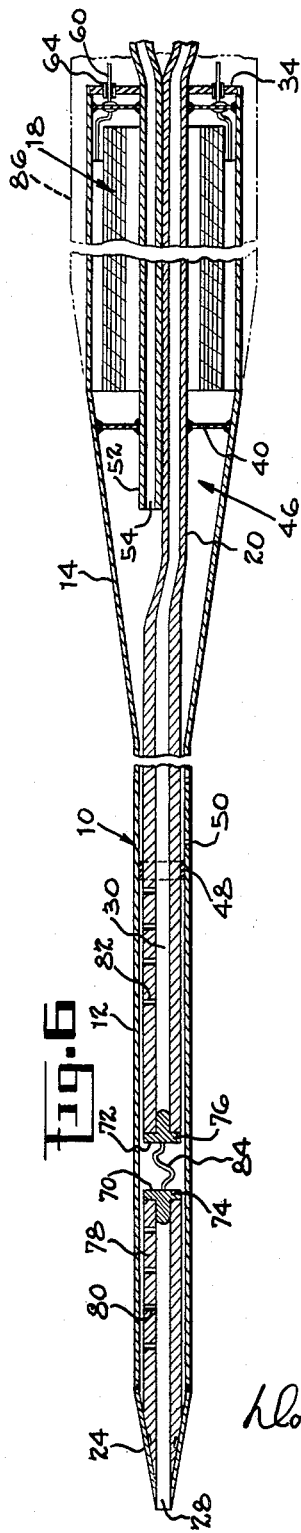
FIGURE 6 is a longitudinal sectional view of the tube of FIGURE 5.

The dot-dash lines indicated at 86 in FIGURE 5 represent a boom for mounting the Pitot static tube upon an aircraft. The boom may project forwardly from the nose or from a wing of the aircraft. This figure also illustrates the small frontal area and the thinness of the tube which adapts it to supersonic flight conditions. It will be apparent from FIGURE 6 that the forward end of the tube, ahead of the static pressure openings 50, is susceptible to changes in shape, the point being that the shape may be varied within wide limits while still incorporating the principles of the invention. Furthermore, the simple expedient of blocking the static pressure holes and omitting the static pressure tube 52 converts the tube into a measuring instrument for total pressure only.

Various expedients may be employed to concentrate the heat induced into the secondary winding comprising the tube assembly. For example, the cross sectional area of the outer sheath may be reduced in area where a build-up of heat is required. Additionally, the cross sectional area may be reduced gradually from the rear to the forward end. Also, high electrical resistant sections may be utilized to concentrate the current in desired areas. It has been determined empirically that there is a concentration of heat at the forward tip of the tube where there is a sharp reversal in the direction of flow of the induced current. This produces in effect, a high resistance joint at the forward ends of the total pressure and static pressure tubes to localize the heating of the Pitot tube at the tip thereof.

Reference to copending application Serial No. 684,128, filed September 16, 1957, will show that the heating system disclosed here may be employed as a secondary heating system in the Pitot static tube of the copending application with minor modifications, which modifications will be apparent to those skilled in the art.

In this disclosure, the transformer is formed as an integral part or built into the Pitot tube structure itself. It will be apparent, however, that the transformer may be made as a separate unit for example. It may be formed as a part of the boom structure which supports the Pitot tube and the Pitot tube itself slipped into place in the end of the boom to form the secondary winding of the transformer circuit.

Having described my invention I claim:

1. A deicing Pitot tube comprising a total pressure tube, a static pressure tube surrounding and spaced from said total pressure tube to form an annular chamber between said tubes, means joining the forward and rearward ends of said tubes to form a complete electrical circuit, means forming a transformer with said tubes, said transformer having a primary winding and said tubes forming a one-turn secondary winding, and said means joining the rearward ends of said tube being flexible for accommodating relative shifting of said tubes with respect to each other under thermal expansion and contraction.

2. A deicing Pitot tube comprising a total pressure tube, a static pressure tube surrounding and spaced from said total pressure tube to form an annular chamber between said tubes, means joining the forward and rearward ends of said tubes to form a complete electrical circuit, means forming a transformer with said tubes, said transformer having a primary winding located in said annular chamber, said tubes forming a one-turn secondary winding, and means forming a water trap in said total pressure tube.

3. A deicing Pitot tube comprising an inner tube, an outer tube spaced from and concentric with said inner tube to form an annular chamber therebetween, means electrically connecting said tubes at the forward ends thereof while leaving said inner tube open at the forward end thereof, first means blocking said inner tube rearwardly of its forward opening, second means blocking said annular chamber rearwardly of said first blocking means, said inner tube having orifices into said annular chamber forward of said first blocking means and between said first and second blocking means to form a water trap, means electrically connecting the rear portions of said tubes to form a closed electrical circuit, means forming a transformer with said tubes, said transformer having a primary winding and said tubes forming a one-turn secondary winding.

4. A deicing Pitot tube comprising an inner tube, an outer tube spaced from and concentric with said inner tube to provide an annular chamber therebetween, means electrically connecting said tubes at the forward ends thereof while leaving said inner tube open at the forward end therof, an electrically conductive plug blocking said inner tube rearwardly of its forward opening and defining a separation in said inner tube, a second electrically conductive plug blocking the inner tube rearwardly of said separation, means electrically connecting said plugs, said inner tube having orifices therein opening into said annular chamber forward of said first plug means and additional orifices opening into said annular chamber to the rear of said second plug to provide a water trap, means electrically connecting the rear portions of said tubes to form a closed electrical circuit, means forming a transformer with said tubes, said transformer having a primary winding and said tubes forming a one-turn secondary winding.

5. A de-icing Pitot tube comprising, an elongated total pressure tube which is open to atmosphere at its forward end, a static pressure tube which is larger in section than the total pressure tube and which surrounds the total pressure tube to provide a chamber between the two tubes, said static tube being provided with openings to admit air at static pressure into said chamber, means closing the space between the forward ends of the static pressure tube and the total pressure tube, said means forming an electrical connection between said tubes, means electrically connecting the rearward ends of the static pressure tube and the total pressure tube to form a closed electrical circuit, the rear portion of said static pressure tube being flared outwardly to provide an enlarged space between it and said total pressure tube, a transformer core disposed around said total pressure tube in said enlarged area, a primary winding around said core, said total and static pressure tubes comprising the secondary winding of a transformer, said tubes being resistive to the passage of electric current, so as to become heated upon the energization of said transformer primary.

6. A de-icing Pitot tube comprising, an elongated total pressure tube which is open to atmosphere at its forward end, a static pressure tube which is larger in section than the total pressure tube and which surrounds the total pressure tube to provide a chamber between the two tubes, said static tube being provided with openings to admit air at static pressure into said chamber, means closing the space between the forward ends of the static pressure tube and the total pressure tube, said means forming an electrical connection between said tubes, means electrically connecting the rearward ends of the static pressure tube and the total pressure tube to form a closed electrical circuit, a toroidal transformer core and primary winding disposed around said total pressure tube at the rear thereof, said total and static pressure tubes comprising at least a portion of the secondary winding of a transformer, said tubes being resistive to the passage of electric current therethrough, so as to become heated upon the energization of said transformer primary.

7. A de-icing Pitot tube comprising, an elongated total pressure tube which is open to atmosphere at its forward end, a static pressure tube which is larger in section than the total pressure tube and which surrounds the total pressure tube to provide a chamber between the two tubes, said static tube being provided with openings to admit air at static pressure to said chamber, means closing the space between the forward ends of the static pressure tube and the total pressure tube, said means forming an electrical joint connection between said tubes, means electrically connecting the rearward ends of the static pressure tube and the total pressure tube to form a closed electrical circuit, means forming a transformer core and primary winding, said total and static pressure tubes comprising at least a portion of the secondary winding of a transformer, said tubes being resistive to the passage of current therethrough, so as to become heated upon the energization of said transformer primary.

8. The de-icing Pitot tube of claim 7 wherein the joint at the forward ends of said tubes is a high resistance joint to localize the heating of said Pitot tube at the tip thereof.

9. A de-icing Pitot tube comprising, an elongated total pressure tube which is open to atmosphere at its forward end, a static pressure tube which is larger in diameter than the total pressure tube and which surrounds the total pressure tube to provide an annular chamber between the two tubes, said static tube being provided with openings to admit air at static pressure to said chamber, means closing the space between the forward ends of the static pressure tube and the total pressure tube, said means forming an electrical connection between said tubes, means at the rearward end of said Pitot tube closing said annular chamber electrically connecting said tubes to form a closed electrical circuit, a transformer core and primary winding disposed around said total pressure tube within the closed annular chamber, the one-turn circuit formed by said total and static pressure tubes comprising the secondary winding of a transformer, said total pressure tube projecting through said rearward closing means for communication with an air speed indicator, and passage means extending into said annular chamber at the rear thereof for bringing static pressure into communication with said air speed indicator, said tubes being resistive to the passage of current therethrough, so as to become heated upon the energization of said transformer primary.

10. A de-icing Pitot tube according to claim 9 wherein said rearward closure means is flexible to accommodate relative shifting of said tubes with respect to each other under thermal expansion and contraction.

11. In a Pitot tube having a total pressure tube and a static pressure tube, a transformer core disposed between said tubes and surrounding one of said tubes, a primary winding on said core, said tubes being electrically connected to one another both forwardly and rearwardly of a transformer and comprising a one-turn transformer secondary, said tubes being made of an electrically resistant material so as to become heated upon the application of alternating current to said primary.

References Cited in the file of this patent

UNITED STATES PATENTS

| | | |
|---|---|---|
| 2,283,045 | Carbonara | May 12, 1942 |
| 2,325,018 | Moss | July 20, 1943 |
| 2,391,994 | McCollum | Jan. 1, 1946 |
| 2,616,022 | Arnaud | Oct. 28, 1952 |
| 2,662,402 | Ince et al. | Dec. 15, 1953 |
| 2,671,845 | Chromy | Mar. 9, 1954 |
| 2,814,712 | Fulmer | Nov. 26, 1957 |

FOREIGN PATENTS

| | | |
|---|---|---|
| 238,396 | Germany | Sept. 23, 1911 |
| 750,417 | Great Britain | June 13, 1956 |